United States Patent [19]

Flentge

[11] Patent Number: 5,795,011
[45] Date of Patent: Aug. 18, 1998

[54] TONNEAU COVER

[76] Inventor: Rich Flentge, Rte. 7, Box 129, Benton, Ky. 42025

[21] Appl. No.: 658,551

[22] Filed: Jun. 5, 1996

[51] Int. Cl.[6] ............................................. B60P 7/02
[52] U.S. Cl. ............................ 296/100; 160/380; 52/279
[58] Field of Search ................................ 296/100; 160/380, 160/381, 379, 376; 24/72.5, 72.7, 114.12, 113 MP, 68 CD; 52/278, 279, 280

[56] References Cited

U.S. PATENT DOCUMENTS

| | | | |
|---|---|---|---|
| 2,627,311 | 2/1953 | Kaufmann | 160/395 |
| 4,153,981 | 5/1979 | Stuppy | 24/243 |
| 4,279,064 | 7/1981 | Simme | 24/248 |
| 4,341,255 | 7/1982 | Mock | 160/369 |
| 4,607,876 | 8/1986 | Reed | 296/100 |
| 4,639,033 | 1/1987 | Wheatley et al. | 296/100 |
| 4,647,103 | 3/1987 | Walblay | 296/100 |
| 4,730,866 | 3/1988 | Nett | 269/100 |
| 4,789,197 | 12/1988 | Lewis | 296/100 |
| 4,792,179 | 12/1988 | Stevens | 296/100 |
| 4,807,921 | 2/1989 | Champie, III et al. | 296/98 |
| 4,838,602 | 6/1989 | Nett | 296/100 |
| 4,926,605 | 5/1990 | Milliken et al. | 52/63 |
| 5,121,960 | 6/1992 | Wheatley | 296/100 |
| 5,165,750 | 11/1992 | Pirhonen | 296/100 |
| 5,203,055 | 4/1993 | Broadwater, Sr. | 24/462 |
| 5,207,262 | 5/1993 | Rushford | 160/354 |
| 5,263,761 | 11/1993 | Hathaway et al. | 296/100 |
| 5,275,458 | 1/1994 | Barben et al. | 296/100 |

Primary Examiner—Jesus D. Sotelo

[57] ABSTRACT

A tonneau cover for an open truck bed having a plurality of panel members made of thin steel, fiberglass and foam assembled by h-shaped rail members and corner connectors. A hinge assembly is provided for pivoting or releasably attaching the cover to the truck bed.

23 Claims, 3 Drawing Sheets

TONNEAU COVER

BACKGROUND OF THE INVENTION

The present invention relates to a multi-panel framed tonneau system for providing a weatherproof covering over an opening in various structures including open bed trucks.

Tonneau covers for use over an open bed pickup truck are well known. The most common tonneau cover includes a panel made of pour molded fiberglass resin. Depending on the truck, a specific mold must be designed to meet the specifications for the open bed. For each tonneau cover design, a particular mold must be purchased driving up the cost of each cover.

The weight of a fiberglass resin panel used for some tonneau covers presents a number of problems for the user. Failure to properly align the cover during the handling can scratch the top of the sides. The weight of a tonneau cover can make alignment difficult and burdensome. Accordingly, there is a need for a tonneau cover made of lightweight material which can be easily handled during removal and alignment.

SUMMARY OF THE INVENTION

It is an object of the present invention to provide a lightweight tonneau cover having a multi-panel framing system.

A more specific object of the invention is to provide a lightweight panel fastening system having h-shaped rail members and a plurality of lightweight panels interconnected by a plurality of I-beams.

A further object of the present invention is to provide a light weight tonneau cover having a quick acting hinge for lifting the tonneau cover for access to the truck bed.

A further object of the present invention is to provide a tonneau cover having a corner joining fastening system.

Yet a further object of the present invention is to provide a tonneau cover having a weather seal to protect the truck bed.

The above and other objects are achieved, according to the present invention by a lightweight tonneau cover utilized to cover an opening in a structure, the opening having a periphery, the structure having sidewalls surrounding the opening with flat upper surfaces extending along the periphery of the opening, and the cover including h-shaped rails joined at each corner by corner connectors to form an outer frame, and a plurality of lightweight panel members interconnected by a plurality of I-beams connected to the outer frame to form a tonneau cover.

DESCRIPTION OF THE PREFERRED EMBODIMENTS

Figure 1:
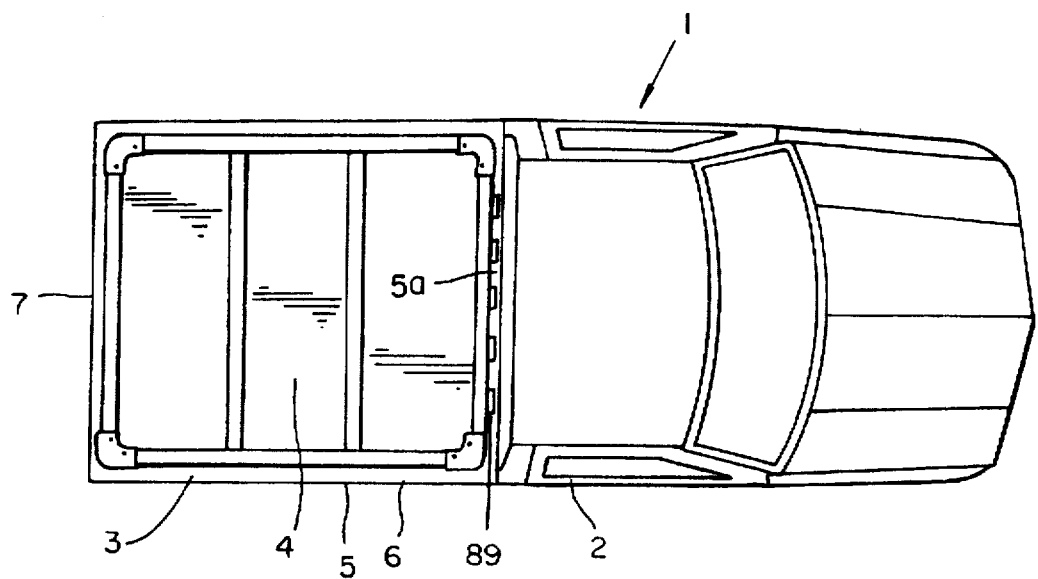
FIG. 1 is an isometric view of a truck showing the invention covering the truck bed thereof.

With reference to FIG. 1, a truck 1 is illustrated and presents a truck body 2 having a truck bed 3 covered by the present invention tonneau cover 4. The tonneau cover is removably and pivotably positioned over the truck bed 3 and is extremely lightweight. The truck body 2 has sidewalls 5, top walls 6 and end gate 7. The top wall 5a, located near the cab, has a top surface and is adjacent an inside rear wall 5b which is used in mounting the tonneau cover. The principal use contemplated for the present invention tonneau cover is for an open bed truck as illustrated in FIG. 1. However, one can imagine other advantageous uses such as for covering stationary structures, open areas, etc., and it is expected that those purchasing such a system may utilize it in a wide variety of imaginative ways.

Figure 2:
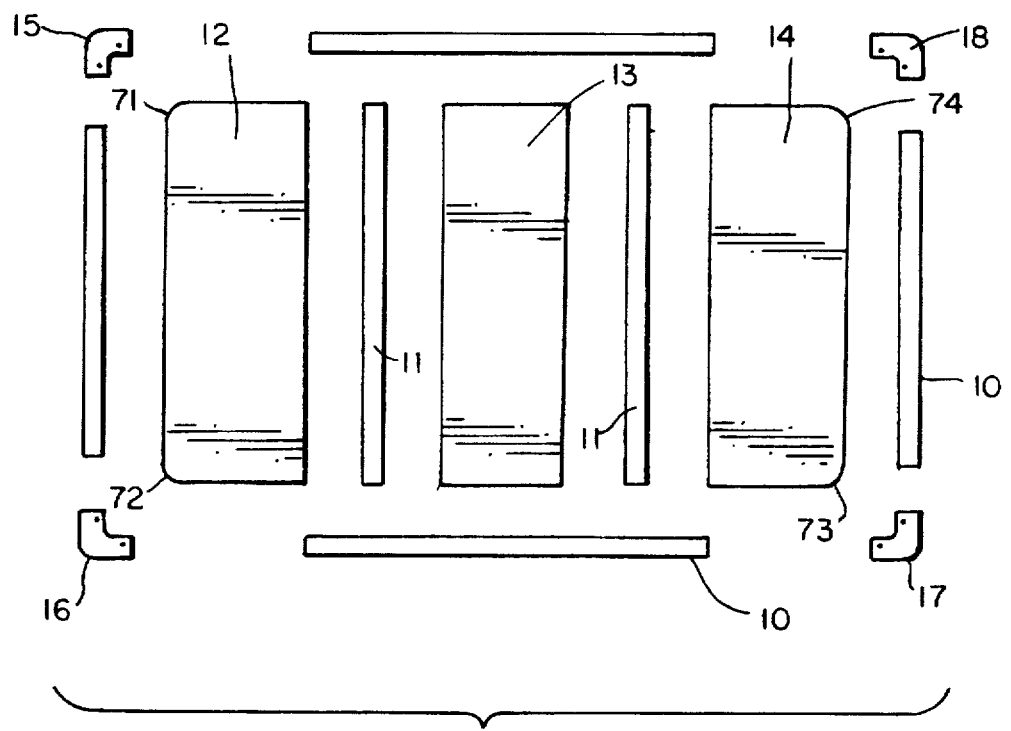
FIG. 2 is an exploded top view of the present invention tonneau cover.
Figure 3:
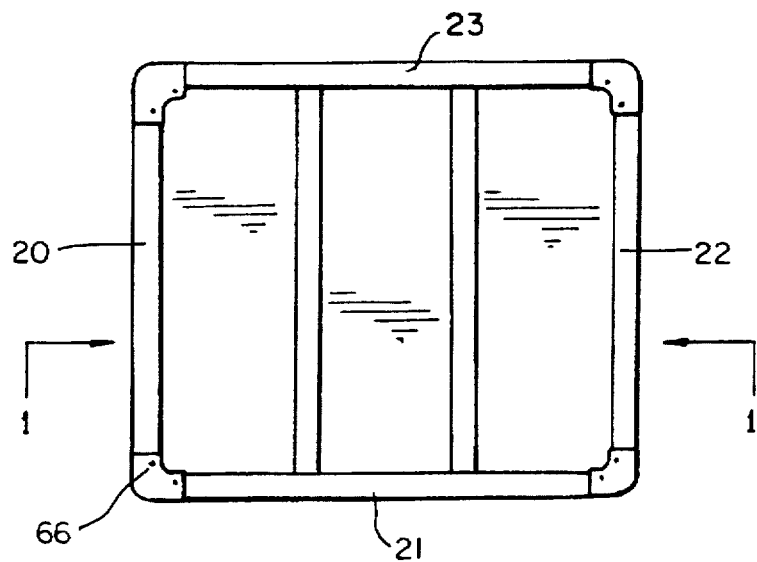
FIG. 3 is a top view of the present invention tonneau cover.
Figure 4:
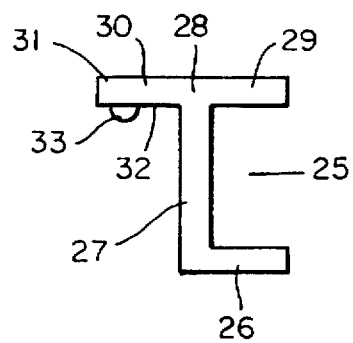
FIG. 4 is a side view of an h-shaped rail member.
Figure 6:
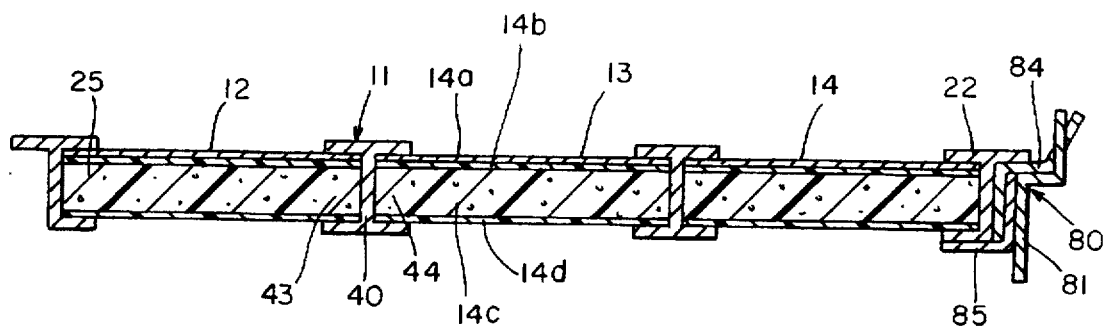
FIG. 6 is a cross sectional view of the present invention tonneau cover taken along lines 1—1 of FIG. 3.

In FIG. 2, the present invention tonneau cover is illustrated having an outer frame 10, cross rails 11 and a plurality of panel members 12, 13 and 14. Each panel member is constructed of a top thin sheet steel member 14a, and upper fiberglass layer 14b, a cellular core member 14c and a bottom fiberglass layer 14d, as shown if FIG. 6. The panels provide excellent insulative qualities and are resistant to scratching, weather and warping. The outer frame 10, cross rails 11, and panel members 12, 13 and 14 are secured by corner connectors 15, 16, 17 and 18. The assembly of the above noted parts is easy, quick and provides a tonneau cover that can be handled by a single user without assistance. Moreover, because the cover includes a plurality of small ports, packaging and shipping of the cover is inexpensive.

As shown in FIGS. 3–6, the frame outer 10 is made of h-shaped rail members 20, 21, 22 and 23. Each h-shaped rail member has a receiving channel 25 formed by a bottom support leg 26, a rear support wall 27 and a top support member 28. The top support member includes a top support leg 29 and a lip member 30. The lip member has a top surface 31 and a bottom surface 32. A seal 33 is attached to the bottom surface 32 on each h-shaped rail member to rest on the top wall 6 to prevent scratching and seal the open truck bed from inclement weather.

Figure 5:
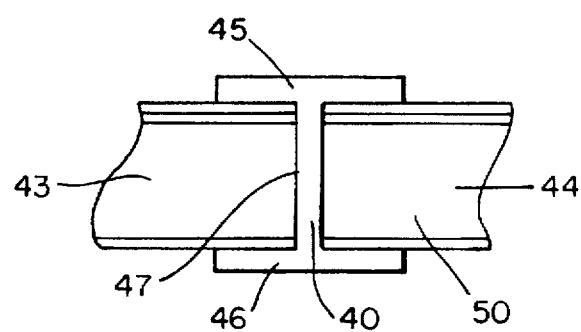
FIG. 5 is a side view of an I-beam.

Each receiving channel 25 is structured to receive a panel member. The panel members fit in all receiving channels by interference fit avoiding the need for extra screws or connectors. The panel members 12, 13 and 14 are assembled to form a planar unit through the use of cross rails 11. Each cross rail 11 includes an I-beam 40 as shown in FIG. 5. Each I-beam has two support channels 43 and 44 which receive ends of the panel members. The support channels are formed by top wall member 45, bottom wall member 46 and back wall member 47 which provides a back for each panel end 50. The cross rails and the h-shaped rail members are made of extruded aluminum which is light weight and easy to lift. The ends of each panel member are positioned in the support channels of each cross rail and then each h-shaped rail member is secured to an end of each panel member to form the periphery of the tonneau cover except for the corners.

Figures 7, 8:
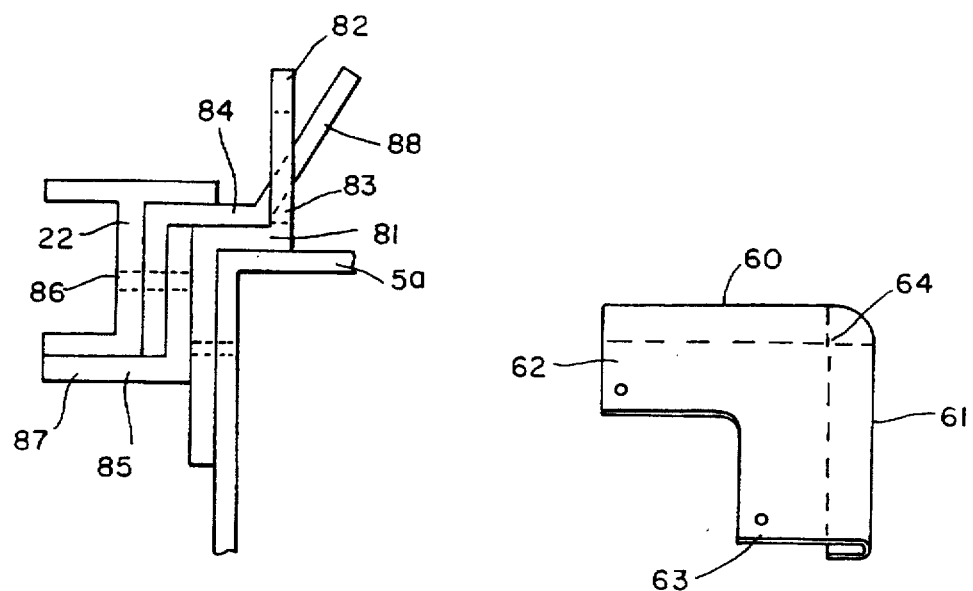
FIG. 7 is a side view of the present invention hinge means.
FIG. 8 is perspective view of a corner connector.

The corner connectors 15, 16, 17 and 18 are then attached at each open corner of the tonneau cover. As shown in FIG. 8, each corner connector has two back walls 60 an 61, a top wall 62, a bottom wall 63 and a corner channel 64. Each corner 71, 72, 73 and 74 is slid into each corner channel until panel ends are flush with the back walls of the corner connectors. Rivets 66 are then used to attach each cover member to corresponding h-shaped rail member and corresponding cross rails. After the tonneau cover has been riveted together, a lightweight planar unit is now complete which can be easily handled by the user. The tonneau cover can then be painted and/or coated with weatherproofing material to display a pleasing, durable, outer surface. Painting can also take place before assembly.

The mounting of the tonneau cover to the open bed of the truck will now be described in detail. The tonneau cover is mounted to the truck by a hinge assembly 80. The hinge assembly includes a base member 81 connected to the top surface 5a of the truck bed and is also attached to the rear inside surface of the truck bed 5b. The base member has a Z-shaped configuration with an upper end portion 82 extending parallel to the rear inside surface of the truck bed but extending above the top surface 5a. The upper end portion 82 includes a slot 83. Secured to rear end h-shaped rail member 22 is a pivoting member 84 and an L-shaped support member 85. The L-shaped support member is connected to the pivoting member and the rear h-shaped rail member by any suitable attachment means such as screws, bolts or rivets. The L-shaped support member has a bottom extension 87 that extends under the tonneau cover and provides further support during lifting of the cover. The pivoting member 84 is sandwiched between the rear end h-shaped rail member 22 and the I-shaped support member 85. The pivoting member includes a tongue 88 that fits loosely in the slot 83 formed in the base member. The tongue permits the entire tonneau cover to pivot open for access into the open bed. In addition, the construction of the tongue and slot permit easy removal of the tonneau cover from the truck bed. The tongue extends through the slot and sits at an angle greater than 45 degrees relative to the plane of the cover, the ideal angle 60 degrees relative to the plane of the cover. This angle is important because the hinge will prevent sliding of the cover relative to the bed, permit the cover to pivot and yet releasably secure the cover to the bed for quick removal or covering. A plurality of hinge assemblies 80 may be used depending on the size of the opening bed. Each hinge assembly may be secured like that described above.

The user may easily attach and remove the present invention tonneau cover because of its light weight construction and design. The h-shaped rail member, I-beam rail member and corner connectors permit easy, quick assembly of the unit and allows packaging at low cost.

What is claimed:

1. A tonneau cover for an open truck bed, said bed having side walls and a closed end wall having a top surface, said tonneau cover comprising:

a plurality of panel members, each panel member having an upper thin steel sheet, an adjacent fiberglass layer, a core layer and a bottom fiber glass layer;

a plurality of I-shaped cross rails, each cross rail having two receiving channels for receiving a panel member;

an outer frame, said outer frame formed by a plurality of h-shaped rail members, each receiving channel for receiving a panel member, said outer frame further formed by a plurality of corner connectors, each corner connector having a receiving channel for receiving ends of said h-shaped rail members; and, a hinge assembly, said hinge assembly having a base member connected to said top surface of said truck bed and a pivoting member connected to said h-shaped rail member, said base member having a slot and said pivoting member having a tongue for loosely fitting into said slot to pivotably support said tonneau cover and permit removal of said tonneau cover from said open bed.

2. A tonneau cover as recited in claim 1, said tonneau cover comprising a plurality of I-shaped cross rails, each cross rail having two receiving channels for receiving a panel member.

3. A tonneau cover as recited in claim 1, said tonneau cover further comprising a plurality of hinge assemblies mounted on said tonneau cover and on said truck bed for pivotably connecting said tonneau cover to said truck.

4. A tonneau cover as recited in claim 1, said tonneau cover hinge assembly pivoting member tongue positioned at an angle of greater than 45 degrees relative to the plane of the bed when the cover is in closed position.

5. A tonneau cover as recited in claim 1, said tonneau cover further comprising a seal for sealing the open bed of the truck when the tonneau cover is in closed position.

6. A tonneau cover as recited in claim 1, said outer frame member including an L-shaped support member connected to said pivoting member to provide further support to said hinge assembly during lifting of said tonneau cover.

7. A tonneau cover as recited in claim 1, said panels secured within said receiving channels by interference fit.

8. A tonneau cover for an open truck bed, said bed having side walls and a closed end wall having a top surface, said tonneau cover comprising:

a plurality of panel members, a core layer and a bottom fiber glass layer;

a plurality of I-shaped cross rails, each cross rail having two receiving channels for receiving a panel member;

an outer frame, said outer frame formed by a plurality of h-shaped rail members, each receiving channel for receiving a panel member, said outer frame further formed by a plurality of corner connectors, each corner connector having a receiving channel for receiving ends of said h-shaped rail members; and, a hinge assembly, said hinge assembly having a base member connected to said top surface of said truck bed and a pivoting member connected to said h-shaped rail member, said base member having a slot and said pivoting member having a tongue for loosely fitting into said slot to pivotably support said tonneau cover and permit removal of said tonneau cover from said open bed.

9. A tonneau cover as recited in claim 8, each panel member made of an upper thin steel sheet, an adjacent fiberglass layer, a core layer and a bottom fiberglass layer.

10. A tonneau cover as recited in claim 8, said tonneau cover comprising a plurality of I-shaped cross rails, each cross rail having two receiving channels for receiving a panel member.

11. A tonneau cover as recited in claim 8, said tonneau cover further comprising a plurality of hinge assemblies mounted on said tonneau cover and on said truck bed for pivotably connecting said tonneau cover to said truck.

12. A tonneau cover as recited in claim 8, said tonneau cover hinge assembly pivoting member tongue positioned at an angle of greater than 45 degrees relative to the plane of the bed when the cover is in closed position.

13. A tonneau cover as recited in claim 8, said tonneau cover further comprising a seal for sealing the open bed of the truck when the tonneau cover is in closed position.

14. A tonneau cover as recited in claim 8, said outer frame member including an L-shaped support member connected to said pivoting member to provide further support to said hinge assembly during lifting of said tonneau cover.

15. A tonneau cover as recited in claim 8, said panels secured within said receiving channels by interference fit.

16. A tonneau cover for an open truck bed, said bed having side walls and a closed end wall having a top surface, said tonneau cover comprising:

a plurality of panel members;

an outer frame, said outer frame formed by a plurality of h-shaped rail members, each receiving channel for receiving a panel member, said outer frame further formed by a plurality of corner connectors, each corner connector having a receiving channel for receiving ends of said h-shaped rail members; and, a hinge assembly, said hinge assembly having a base member connected to said top surface of said truck bed and a pivoting member connected to said h-shaped rail member, said base member having a slot and said pivoting member having a tongue for loosely fitting into said slot to pivotably support said tonneau cover and permit removal of said tonneau cover from said open bed.

17. A tonneau cover as recited in claim 16, each panel member made of an upper thin steel sheet, an adjacent fiberglass layer, a core layer and a botton fiberglass layer.

18. A tonneau cover as recited in claim 16, said tonneau cover comprising a plurality of I-shaped cross rails, each cross rail having two receiving channels for receiving a panel member.

19. A tonneau cover as recited in claim 16, said tonneau cover further comprising a plurality of hinge assemblies mounted on said tonneau cover and on said truck bed for pivotably connecting said tonneau cover to said truck.

20. A tonneau cover as recited in claim 16, said tonneau cover hinge assembly pivoting member tongue positioned at an angle of greater than 45 degrees relative to the plane of the bed when the cover is in closed position.

21. A tonneau cover as recited in claim 16, said tonneau cover further comprising a seal for sealing the open bed of the truck when the tonneau cover is in closed position.

22. A tonneau cover as recited in claim 16, said outer frame member including an L-shaped support member connected to said pivoting member to provide further support to said hinge assembly during lifting of said tonneau cover.

23. A tonneau cover as recited in claim 16, said panels secured within said receiving channels by interference fit.

* * * * *